(12) United States Patent
Xu

(10) Patent No.: US 6,871,876 B2
(45) Date of Patent: Mar. 29, 2005

(54) SEAT BELT RESTRAINT SYSTEM WITH DOUBLE SHOULDER BELTS

(76) Inventor: Zhaoxia Xu, 4694 Sycamore Dr., Ypsilanti, MI (US) 48197

( * ) Notice: Subject to any disclaimer, the term of this patent is extended or adjusted under 35 U.S.C. 154(b) by 0 days.

(21) Appl. No.: 10/361,191

(22) Filed: Feb. 7, 2003

(65) Prior Publication Data

US 2004/0155451 A1 Aug. 12, 2004

(51) Int. Cl.$^7$ .............................................. B60R 22/00
(52) U.S. Cl. .................................................. 280/801.1
(58) Field of Search ............................. 280/801.1, 807, 280/808

(56) References Cited

U.S. PATENT DOCUMENTS

| | | | |
|---|---|---|---|
| 3,713,693 A | * | 1/1973 | Cadiou ........................ 297/471 |
| 3,994,513 A | * | 11/1976 | Courtis et al. ............... 280/808 |
| 4,231,616 A | * | 11/1980 | Painter ........................ 297/481 |
| 4,289,328 A | | 9/1981 | Repp |
| 5,123,673 A | | 6/1992 | Tame |
| 5,176,402 A | | 1/1993 | Coulon |
| 5,524,928 A | * | 6/1996 | Monagas ..................... 280/808 |
| 6,076,894 A | | 6/2000 | Busch |
| 6,116,696 A | | 9/2000 | Widman |
| 6,234,529 B1 | | 5/2001 | Ellison |
| 6,302,442 B1 | | 10/2001 | Shimozawa |
| 6,328,386 B1 | | 12/2001 | Good |
| 6,334,628 B1 | | 1/2002 | Newball |
| 6,336,662 B1 | | 1/2002 | Kurita |
| 6,375,270 B1 | | 4/2002 | Sullivan |

* cited by examiner

Primary Examiner—Faye M. Fleming

(57) ABSTRACT

A seat-belt-restraint-system (40) for a vehicle occupant (30) seated in a vehicle seat (32). Seat-belt-restraint-system (40) includes two shoulder belts (42) and (46), a middle portion belt (52), a seat belt buckle (60), a seat belt latch (58), a connect mechanism (50), and a lap belt (54). The upper end of shoulder belt (42) is extendable and retractable to the upper portion of the vehicle adjacent the occupant's shoulder. The upper end of shoulder belt (46) is extendable and retractable to the upper portion of seatback (34) adjacent the occupant's shoulder. The lower ends of both shoulder belts (42) and (46) lead to connect mechanism (50). The first end of middle portion belt (52) leads to connect mechanism (50). The second end of middle portion belt (52) is connected to the first end of lap belt (54). The second end of lap belt (54) is anchored to the vehicle and disposed on the outboard side of occupant (30). Connect mechanism (50) interconnects the lower ends of both shoulder belts (42) and (46) and the first end of middle portion belt (52). Seat belt latch (58) has a webbing loop, through which middle portion belt (52) is threaded, such that seat belt latch (58) is slidable along middle potion belt (58). Seat belt buckle (60) is anchored to the vehicle and disposed on the inboard side of the occupant (30) for lockably receiving seat belt latch (58).

16 Claims, 10 Drawing Sheets

SEAT BELT RESTRAINT SYSTEM WITH DOUBLE SHOULDER BELTS

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION

1. Field of Invention

This invention generally relates to vehicle occupant restraints. More specifically, this invention relates to seat belt restraint systems.

2. Prior Art

Vehicle occupant restraints, including seat-belt-restraint-systems and devices, are important and well-known components of vehicle safety systems. When a vehicle experiences severe impact, a properly belted-in occupant is held in place by the webbing, thereby avoiding many serious, if not fatal, physical collisions with vehicle interior and/or being thrown from the vehicle. Since their introduction seat-belt-restraint-systems have saved countless lives and reduced the severity of injury in countless more.

Initially seat-belt-restraint-systems provided only a belt across the lap of the occupant. This is the so-called "two-point" seat-belt-restraint-system. Although an improvement over no belt at all, such lap only seat-belt-restraint-systems did nothing to restrain the very dangerous occupant's upper body motions. Therefore, head, neck and back injuries were very common among victims of vehicle collisions who were wearing only a lap belt.

A further improvement to the two-point seat-belt-restraint-systems came with the introduction of a third point of fixation. A second belt, shoulder belt, is provided. The upper end of the shoulder belt is extendable and retractable to the upper portion of the vehicle adjacent the occupant's shoulder. This is the third point of fixation. The lower end of the shoulder belt extends to the lap belt via a sliding seat belt latch. This seat belt latch is engageable with a seat belt buckle anchored to the vehicle and disposed on the inboard side of the occupant. The other end of the lap belt is anchored to the vehicle and disposed on the outboard side of the occupant. These improved seat-belt-restraint-systems are referred to as "three-point" seat-belt-restraint-systems because they provide three fixation points for the webbing. Three-point seat-belt-restraint-systems improve the performance of occupant restraint by restricting the occupant's upper body and lower body motions.

Many patents have been issued to three-point seat-belt-restraint-systems.

U.S. Pat. No. 6,336,662 to Kurita et al., issued on Jan. 8, 2002, describes a three-point seat belt system with a tongue hooking mechanism for a seat belt incorporating a buckle disposed on a side of a seat adjacent to a central portion of a cabin of a vehicle.

U.S. Pat. No. 6,334,628 to Newball et al., issued on Jan. 1, 2002, describes a ceiling retractable three-point seat belt system for restraining an occupant in a vehicle center seat.

U.S. Pat. No. 6,328,386 to Good, issued on Dec. 11, 2001, describes a detachable three point seat belt system, which can be detached to allow the center seat back to be pivoted down.

U.S. Pat. No. 6,302,442 to Shimozawa, issued on Oct. 16, 2001, describes an attachment structure of a three-point seat belt system for a rear seat in which a seat belt retractor can be attached without causing an increase in vehicle weight and an increase in manufacturing cost.

U.S. Pat. No. 6,234,529 to Ellison et al., issued on May 22, 2001, describes a three-point seat belt system with its shoulder belt extendable and retractable to the rear roof for the use by a rear center seat occupant.

U.S. Pat. No. 6,116,696 to Widman et al., issued on Sep. 12, 2000, describes a detachable three-point seat belt system having an interlocking mechanism that requires the wearer to reattach a detached system to the seat prior to fastening the seat belt over the wearer's body.

U.S. Pat. No. 5,176,402 to Coulon, issued on Jan. 5, 1993, describes a three-point seat belt system, which is mounted to the seat frame removably mounted to a vehicle.

U.S. Pat. No. 4,289,328 to Repp et al., issued on Sep. 15, 1981, describes a three-point seat belt system that has a shoulder belt extendable and retractable to the vehicle door.

Three-point seat-belt-restraint-systems have the advantages of convenience of use and good occupant restraint performance. However, There are some important drawbacks. For example, a conventional three-point seat-belt-restraint-system has a shoulder belt end extendable and retractable to the upper portion of a vehicle, most preferably, to pillars or roof rails. These positions are natural choices of seat-belt-restraint-system design because pillars and roof rails are two of the strongest portions of vehicle structures for supporting the belt loads during accidents. But these positions are not close enough to the occupant's shoulder for superior restraint performance, especially for lateral impact accidents, rollover, etc.

Seat-mounted three-point seat-belt-restraint-systems correct the deficiency of pillar/roof-rail mounted seat-belt-restraint-systems by moving the fixation point of the shoulder belt to the upper portion of the vehicle seatback. However, by doing so, they introduce an inevitable drawback. The performance of occupant restraint is, now, solely depending on the vehicle seat. All loads imparted through the restraint system during accidents will be withstood by the seat structure and then by the floor and vehicle underbody. Typically, during a vehicle frontal impact accident, the stiffness of the vehicle seat and that of the floor underneath the seat play a significant role in the performance of occupant restraint. Reinforcement of the seat and the floor underneath the seat to reduce the seat excursion during an accident incurs added weight and cost. This problem is more important for small vehicles, which do not have much flexibility in weight, space, cost, etc.

Currently in the market, only limited number of large vehicles, like trucks, sports utility vehicles, etc., is using seat-mounted three-point seat-belt-restraint-systems.

Seat-mounted four-point seat-belt-restraint-systems have the advantage of good performance of occupant restraint by restraining the occupant to the vehicle seat through two shoulder belts, one on each side of the occupant. However, there are some important drawbacks. First, it is inconvenient to use, thereby discouraging its application. When an occupant sits in a vehicle seat, he/she needs to reach his/her back to get the shoulder belts on both sides. Second, as discussed before about seat-mounted three-point seat-belt-restraintsystems, the performance of occupant restraint solely depends on the vehicle seat. Small vehicles might have difficulties in achieving good safety performance in frontal impact tests and real-world accidents.

Some patents have been granted to four-point seat-belt-restraint-systems.

U.S. Pat. No. 6,375,270 to Sullivan et al., issued on Apr. 23, 2002, describes a seat-mounted four-point seat-belt-restraint-system, which can be adapted for use as a three-point seat-belt-restraint-system.

U.S. Pat. No. 6,076,894 to Busch, issued on Jun. 20, 2000, describes a seat-mounted four-point seat-belt-restraint-system, which has two lap belt portions.

U.S. Pat. No. 5,123,673 to Tame, issued on Jun. 23, 1992, describes a seat-belt-restraint-system, which includes a three-point seat-belt-restraint-system forming a lap belt and a shoulder belt and further includes a second shoulder belt to form a four-point seat-belt-restraint-system.

Currently in the market, very few vehicles are using seat-mounted four-point seat-belt-restraint-systems, except racing cars.

Therefore, it remains desirable to provide a seat-belt-restraint-system that can provide the performance of occupant restraint of both three-point and four-point seat-belt-restraint-systems without losing the convenience of use of three-point seat-belt-restraint-systems. It remains desirable to provide a seat-belt-restraint-system that is safer, more comfortable and convenient to use, and simpler and less expensive to manufacture, for general public against various accident modes.

BRIEF SUMMARY OF THE INVENTION

Accordingly, the present invention is a seat-belt-restraint-system that includes two shoulder belts, a middle portion belt, a connect mechanism, a lap belt, a seat belt latch, and a seat belt buckle.

The upper end of the first shoulder belt is extendable and retractable to the upper portion of the vehicle adjacent the occupant. The upper end of the second shoulder belt is extendable and retractable to the upper portion of the seatback adjacent the occupant. The lower ends of both shoulder belts lead to the connect mechanism. The first end of the middle portion belt leads to the connect mechanism. The connect mechanism interconnects the lower ends of both shoulder belts and the first end of the middle portion belt. The second end of the middle portion belt is connected to the first end of the lap belt. The second end of the lap belt is anchored to the vehicle and disposed on the outboard side of the occupant. The seat belt latch has a webbing loop, through which the middle portion belt is threaded, such that the seat belt latch is slidable along the middle portion belt. The seat belt buckle is anchored to the vehicle and disposed on the inboard side of the occupant for lockably receiving the seat belt latch.

In another embodiment of the present invention, the seat-belt-restraint-system includes two shoulder belts, a lap belt, a latch mechanism, and a seat belt buckle.

The upper end of the first shoulder belt is extendable and retractable to the upper portion of the vehicle adjacent the occupant. The upper end of the second shoulder belt is extendable and retractable to the upper portion of the seatback adjacent the occupant. The lower ends of both shoulder belts lead to the latch mechanism. The first end of the lap belt leads to the latch mechanism. The latch mechanism interconnects the lower ends of both shoulder belts and the first end of the lap belt. The second end of the lap belt is anchored to the vehicle and disposed on the outboard side of the occupant. The seat belt buckle is anchored to the vehicle and disposed on the inboard side of the occupant for lockably receiving the latch mechanism.

Accordingly, the followings are some of the objects, features, and advantages of the present invention:

It is an object of the present invention to provide a seat-belt-restraint-system for use to enhance the performance of occupant restraint against various accident modes.

It is another object of the present invention to provide a seat-belt-restraint-system that provides the benefits in the performance of occupant restraint of both three-point and four-point seat-belt-restraint-systems without losing the convenience of use of three-point seat-belt-restraint-systems.

It is a further more object of the present invention to provide a seat-belt-restraint-system that is convenient to use, thereby encouraging its application and seat belt usage.

It is a further more object of the present invention to provide a seat-belt-restraint-system that is simple and inexpensive to manufacture.

It is a feature of the present invention that this seat-belt-restraint-system has two shoulder belts. One shoulder belt is retractable to the upper portion of the vehicle, preferably, to vehicle pillars or roof rails. And the other shoulder belt is retractable to the upper portion of the vehicle seatback.

It is another feature of the present invention that this seat-belt-restraint-system restrains the occupant to the vehicle seat.

It is a further more feature of the present invention that this seat-belt-restraint-system can be easily reconfigured for use as a regular three-point seat-belt-restraint-system.

It is an advantage of the present invention that this seat-belt-restraint-system provides occupant protection against various accident modes.

It is another advantage of the present invention that this seat-belt-restraint-system provides a larger interaction area on the occupant upper body to better distribute the belt loads during a severe frontal impact accident.

It is a further more advantage of the present invention that this seat-belt-restraint-system provides double security for occupant protection against accidents, due to dual shoulder belts, thereby minimizing the probability of system failure, especially for frontal impact accidents.

Further more features and advantages of the present invention will be readily appreciated, as the same becomes better understood after reading the subsequent description when considered in connection with the accompanying drawings.

BRIEF DESCRIPTION OF THE DRAWING—FIGURES

BRIEF DESCRIPTION OF THE DRAWING-REFERENCE NUMERALS

| | |
|---|---|
| 30 vehicle occupant | 32 vehicle seat |
| 34 seatback | 36 seat portion |
| 38 headrest | 40 seat-belt-restraint-system |
| 42 first shoulder belt | 44 first seat belt retractor |
| 46 second shoulder belt | 48 second seat belt retractor |
| 50 connect mechanism | 52 middle portion belt |
| 54 lap belt | 56 third seat belt retractor |
| 58 seat belt latch | 60 seat belt buckle |
| 62 web guide | 64 hook plate |
| 64a hook | 64b hook |
| 64c webbing loop | 68 eye plate |
| 68a eyelet | 68b webbing loop |
| 70 eye plate | 70a eyelet |
| 70b webbing loop | 72 hook plate |
| 72a hook | 72b webbing loop |
| 72c webbing loop | 76 latch mechanism |
| 78 seat belt latch | 80 hook |
| 82 eye plate | 82a eyelet |
| 82b webbing loop | |

DETAILED DESCRIPTION OF THE INVENTION

Figure 1:
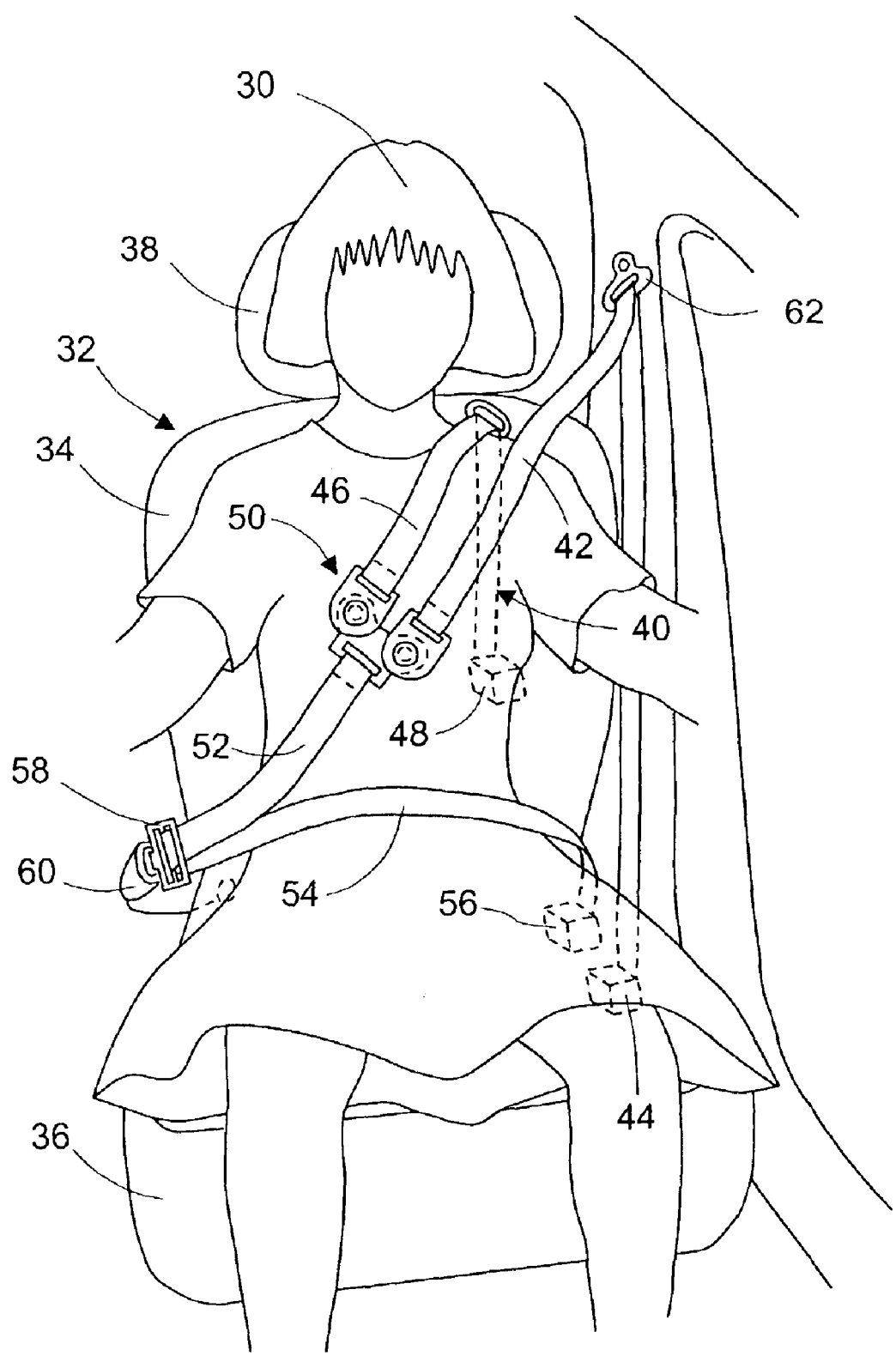
FIG. 1 illustrates an embodiment of the present invention.

Reference is made to FIG. 1, which illustrates an embodiment of the present invention. As shown in FIG. 1, a vehicle occupant 30 is seated in a vehicle seat 32. Seat 32 has a seatback 34, a seat portion 36, and a headrest 38. Also shown in FIG. 1 is the seat-belt-restraint-system 40 of the present invention.

System 40 comprises a first shoulder belt 42, a first seat belt retractor 44, a second shoulder belt 46, a second seat belt retractor 48, a connect mechanism 50, a middle portion belt 52, a lap belt 54, a third seat belt retractor 56, a seat belt latch 58, a seat belt buckle 60, and a web guide 62.

The first end of shoulder belt 42 extends to web guide 62 and further extends to retractor 44. The second end of shoulder belt 42 leads to connect mechanism 50. Retractor 44 is associated with the first end of shoulder belt 42 and secured to the vehicle. The first end of shoulder belt 46 extends to the upper portion of seatback 34 adjacent the occupant's shoulder and further extends to retractor 48. The second end of shoulder belt 46 leads to connect mechanism 50. Retractor 48 is associated with the first end of shoulder belt 46 and secured to the vehicle in seatback 34. The first end of middle portion belt 52 leads to connect mechanism 50. Connect mechanism 50 interconnects the second end of shoulder belt 42, the second end of shoulder belt 46, and the first end of middle portion belt 52. The second end of middle portion belt 52 extends to the first end of lap belt 54. The first end of lap belt 54 connects to the second end of middle portion belt 52 and the second end of lap belt 54 extends to retractor 56. Retractor 56 is associated with the second end of lap belt 54 and secured to the lower portion of the vehicle. Latch 58 has a webbing loop, through which middle portion belt 52 is threaded, such that latch 58 is slidable along middle portion belt 52. Buckle 60 is anchored to the vehicle and disposed on the inboard side of occupant 30 for lockably receiving latch 58. Web guide 62 is anchored to the vehicle on the upper portion of the vehicle adjacent the shoulder of occupant 30, preferably to vehicle pillars or roof rails.

Retractor 56 is provided here to furnish a predetermined length of webbing for lap belt 54. This predetermined length of webbing functions as an adjustment to the length of lap belt 54 for suiting different sizes of occupant 30 and various sizes of vehicle seat 32. It is also used to design the relative position of connect mechanism 50 with respect to occupant 30.

Figure 2:
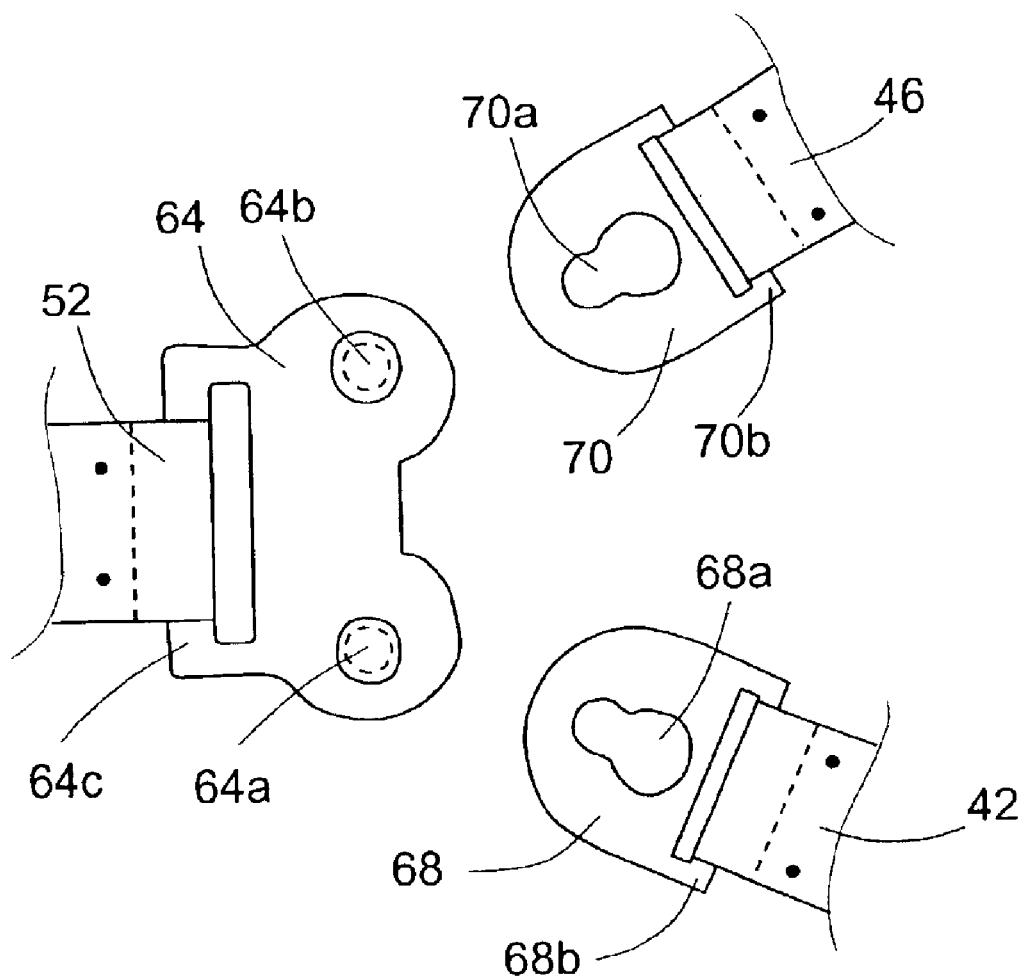
FIG. 2 illustrates the plan view of the connect mechanism in FIG. 1.

FIG. 2 illustrates the plan view of connect mechanism 50 in more details. Mechanism 50 comprises a hook plate 64 and two eye plates 68 and 70. Hook plate 64 has two hooks 64a and 64b. Eye plate 68 has an eyelet 68a and eye plate 70 has an eyelet 70a. Eyelet 68a is for lockably receiving hook 64a and eyelet 70a is for lockably receiving hook 64b. Hook plate 64 further includes a webbing loop 64c connecting to the first end of middle portion belt 52. Eye plate 68 further has a webbing loop 68b connecting to the second end of shoulder belt 42. Eye plate 70 further has a webbing loop 70b connecting to the second end of shoulder belt 46.

Figure 3:
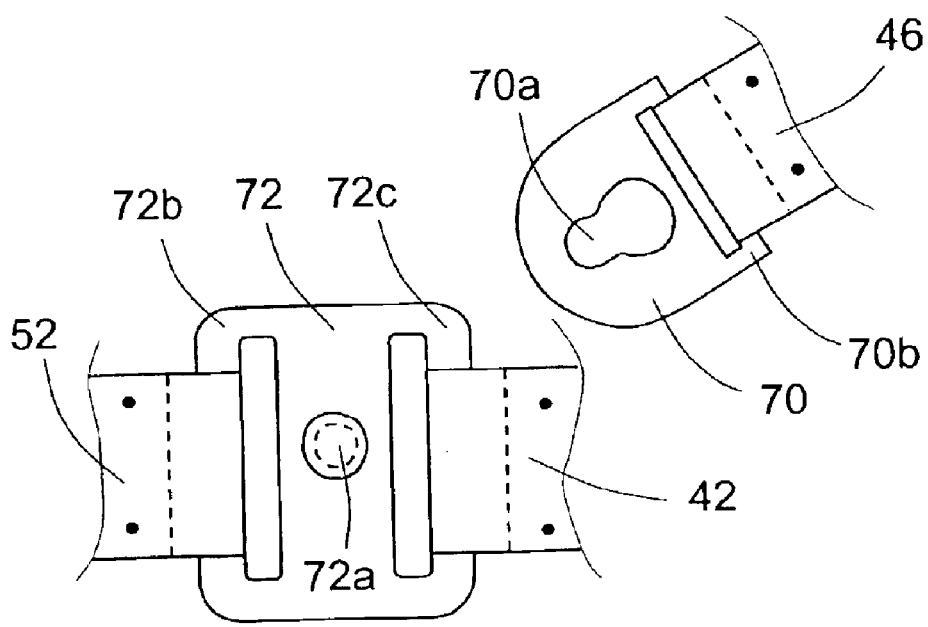
FIG. 3 illustrates the plan view of an alternative design of the connect mechanism in FIG. 1.

FIG. 3 illustrates an alternative embodiment of connect mechanism 50 in FIG. 1. Mechanism 50 comprises a hook plate 72 and an eye plate 70. Hook plate 72 has a hook 72a and two webbing loops 72b and 72c. Webbing loop 72b connects to the first end of middle portion belt 52 and webbing loop 72c connects to the second end of shoulder belt 42. Eye plate 70 has an eyelet 70a and a webbing loop 70b. Eyelet 70a is for lockably receiving hook 72a and webbing loop 70b connects to the second end of shoulder belt 46.

Figure 4:
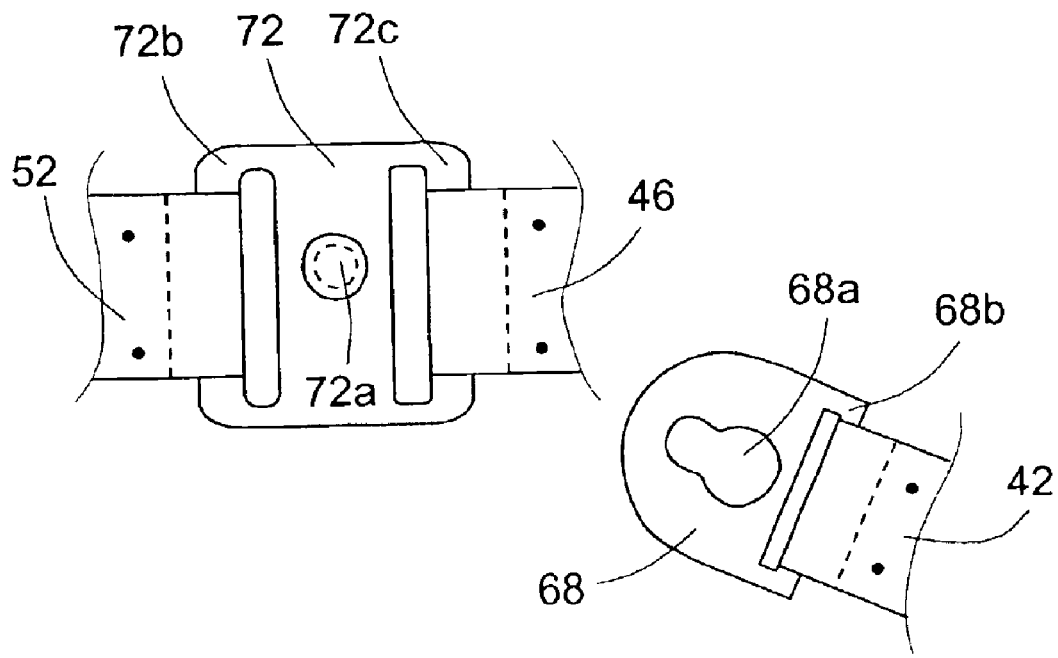
FIG. 4 illustrates the plan view of another alternative design of the connect mechanism in FIG. 1.

FIG. 4 illustrates another alternative embodiment of connect mechanism 50 in FIG. 1. Mechanism 50 comprises a hook plate 72 and an eye plate 68. Hook plate 72 has a hook 72a and two webbing loops 72b and 72c. Webbing loop 72b connects to the first end of middle portion belt 52 and webbing loop 72c connects to the second end of shoulder belt 46. Eye plate 68 has an eyelet 68a and a webbing loop 68b. Eyelet 68a is for lockably receiving hook 72a and webbing loop 68b connects to the second end of shoulder belt 42.

Figure 5:
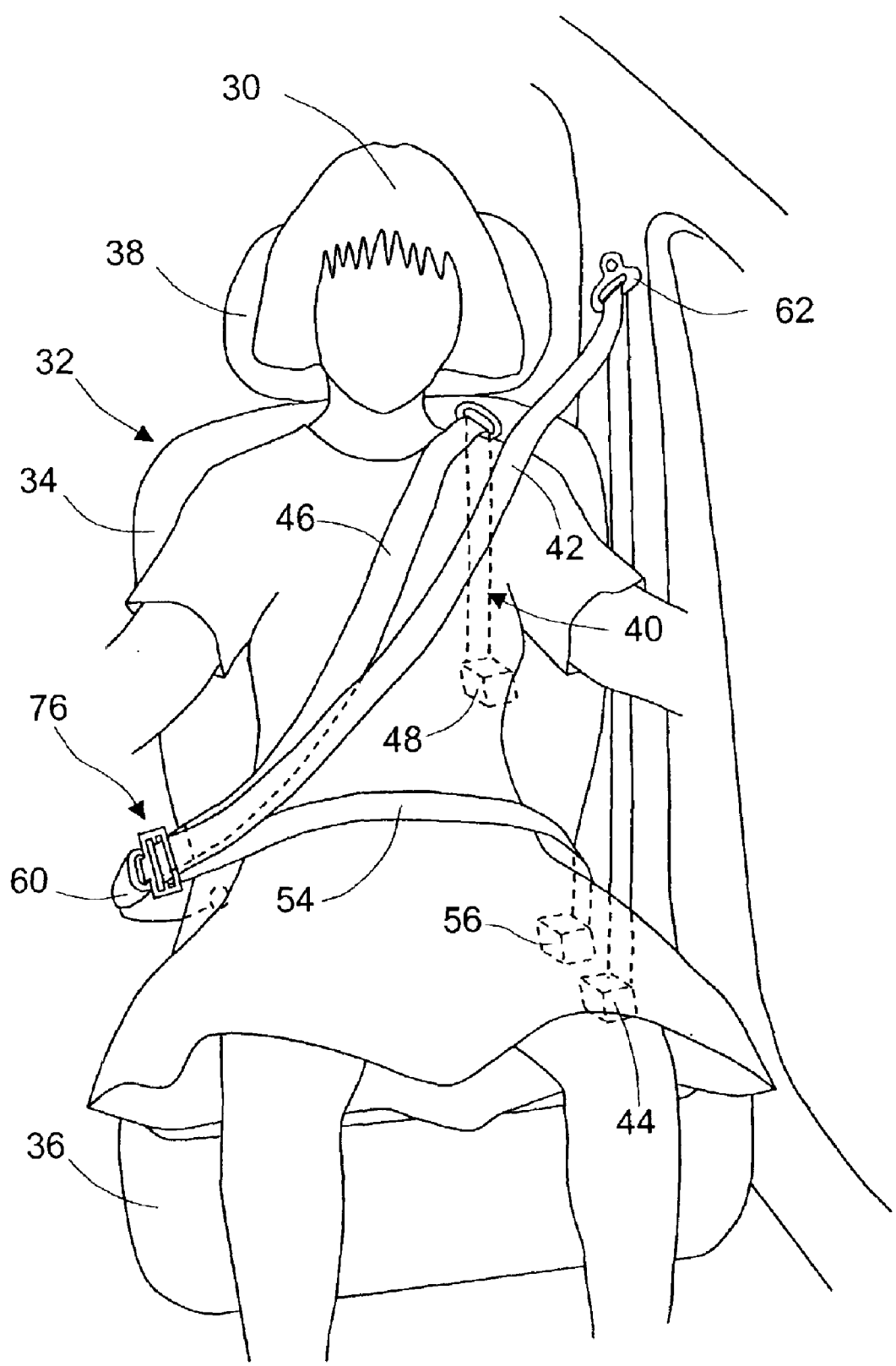
FIG. 5 illustrates an alternative embodiment of the present invention.

Reference is made to FIG. 5, which illustrates an alternative embodiment of the present invention. Seat-belt-restraint-system 40 comprises a first shoulder belt 42, a first seat belt retractor 44, a second shoulder belt 46, a second seat belt retractor 48, a lap belt 54, a third seat belt retractor 56, a latch mechanism 76, a seat belt buckle 60, and a web guide 62.

The first end of shoulder belt 42 extends to web guide 62 and further extends to retractor 44. The second end of shoulder belt 42 leads to latch mechanism 76. Retractor 44 is associated with the first end of shoulder belt 42 and secured to the vehicle. The first end of shoulder belt 46 extends to the upper portion of seatback 34 adjacent the occupant's shoulder and further extends to retractor 48. The second end of shoulder belt 46 leads to latch mechanism 76. Retractor 48 is associated with the first end of shoulder belt 46 and secured to the vehicle in seatback 34. The first end of lap belt 54 leads to latch mechanism 76. The second end of lap belt 54 is anchored to the vehicle and disposed on the outboard side of occupant 30. Retractor 56 is associated with the second end of lap belt 54 and secured to the lower portion of the vehicle. Latch mechanism 76 interconnects the second end of shoulder belt 42, the second end of shoulder belt 46, and the first end of lap belt 54. Buckle 60 is anchored to the vehicle and disposed on the inboard side of occupant 30, for lockably receiving latch mechanism 76. Web guide 62 is secured to the vehicle and disposed on the upper portion of the vehicle adjacent the shoulder of occupant 30, preferably to vehicle pillars or roof rails.

There are numerous possible designs of latch mechanism 76 and consequently there are numerous ways of routing the seat belt webbings. The followings are some of the preferred embodiments. These preferred embodiments are intended to be in the nature of illustration rather than of limitation.

In the first preferred embodiment of latch mechanism 76, shoulder belt 42 is a through-belt. The second end of shoulder belt 42 connects to the first end of lap belt 54. There is a webbing loop on latch mechanism 76, through which lap belt 54 is threaded, such that latch mechanism 76 is slidable along lap belt 54. The second end of shoulder belt 46 is attached to latch mechanism 76.

Figure 6:
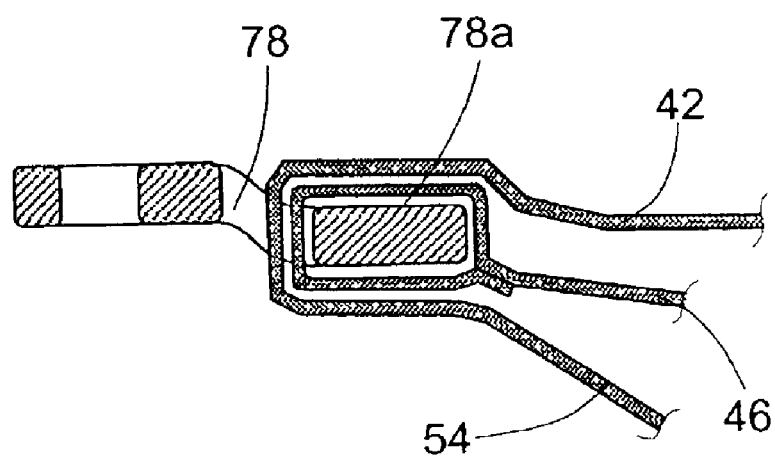
FIG. 6 illustrates the cross-section of a design of the latch mechanism in FIG. 5, cutting through the center to show the routing of the seat belt webbings.

FIG. 6 illustrates the cross-section view of a design of latch mechanism 76, cutting through the center to show the routing of the webbing belts. Latch mechanism 76 comprises a seat belt latch 78. Seat belt latch 78 has a webbing loop 78a. The second end of shoulder belt 46 is attached to webbing loop 78a. The first end of lap belt 54 is connected to the second end of shoulder belt 42. Lap belt 54 is threaded through webbing loop 78a, such that seat belt latch 78 is slidable along lap belt 54.

Figure 7:
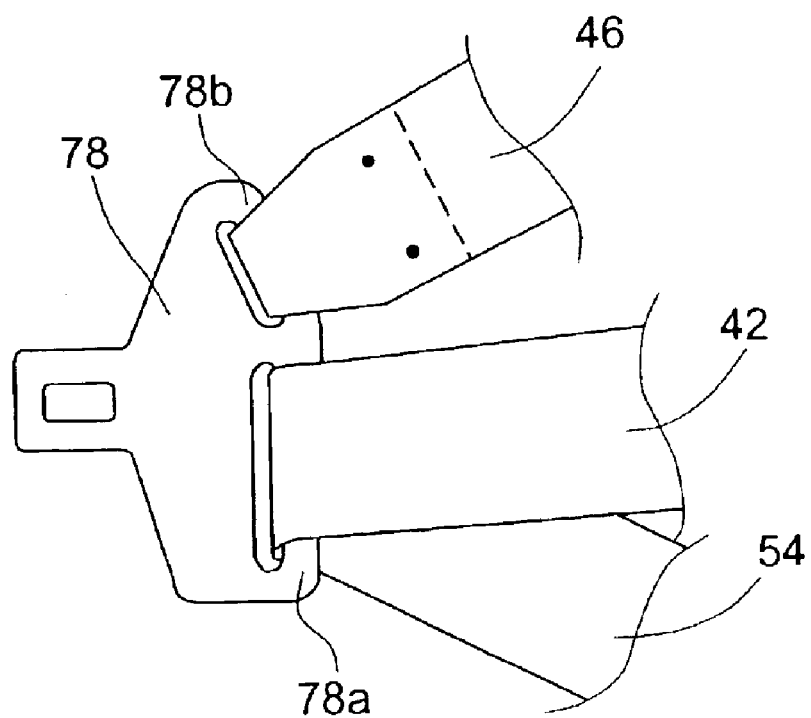
FIG. 7 illustrates the plan view of an alternative design of the latch mechanism in FIG. 6.

FIG. 7 illustrates the plan view of an alternative design of latch mechanism 76 in FIG. 6. Mechanism 76 comprises a seat belt latch 78. Seat belt latch 78 has a webbing loop 78a and a webbing loop 78b. The second end of shoulder belt 46 is attached to webbing loop 78b. The first end of lap belt 54 is connected to the second end of shoulder belt 42. Lap belt 54 is threaded through webbing loop 78a, such that seat belt latch 78 is slidable along lap belt 54.

Figure 8:
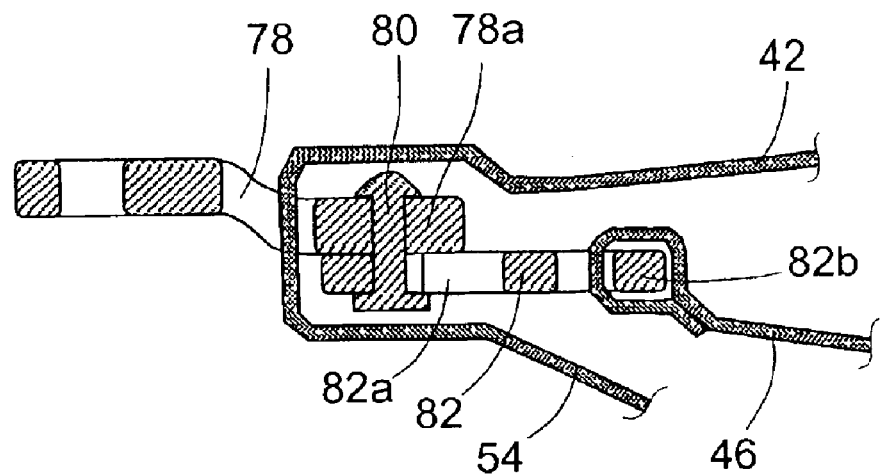
FIG. 8 illustrates the cross-section of an alternative design of the latch mechanism in FIG. 5, cutting through the center to show the routing of the seat belt webbings.

FIG. 8 illustrates the cross-section view of an alternative design of latch mechanism 76 in FIG. 5, cutting through the center to show the routing of the webbing belts. Latch mechanism 76 comprises a seat belt latch 78, a hook 80, and an eye plate 82. Seat belt latch 78 has a webbing loop 78a. Hook 80 is secured on webbing loop 78a. Eye plate 82 has an eyelet 82a for lockably receiving hook 80 and a webbing loop 82b, on which the second end of shoulder belt 46 is attached. The first end of lap belt 54 is connected to the second end of shoulder belt 42. Lap belt 54 is threaded through webbing loop 78a, such that seat belt latch 78 is slidable along lap belt 54.

Figure 9:
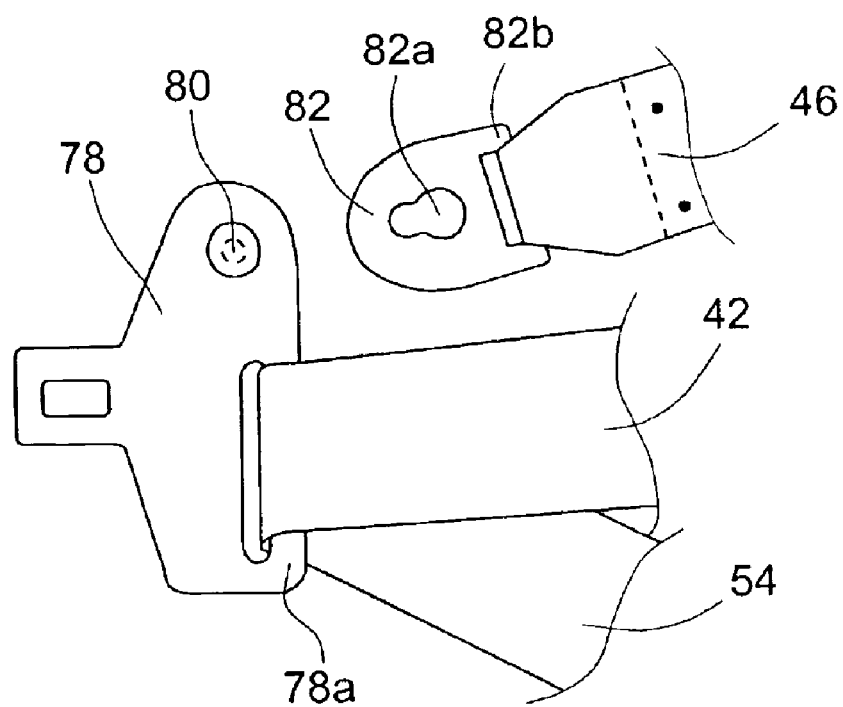
FIG. 9 illustrates the plan view of an alternative design of the latch mechanism in FIG. 8.

FIG. 9 illustrates the plan view of an alternative design of latch mechanism 76 in FIG. 8. Latch mechanism 76 comprises a seat belt latch 78, a hook 80, and an eye plate 82. Seat belt latch 78 has a webbing loop 78a. Hook 80 is secured on seat belt latch 78. Eye plate 82 has an eyelet 82a for lockably receiving hook 80 and a webbing loop 82b, on which the second end of shoulder belt 46 is attached. The first end of lap belt 54 is connected to the second end of shoulder belt 42. Lap belt 54 is threaded through webbing loop 78a, such that seat belt latch 78 is slidable along lap belt 54.

In the second preferred embodiment of latch mechanism 76, shoulder belt 46 is a through-belt. The second end of shoulder belt 46 connects to the first end of lap belt 54. There is a webbing loop on latch mechanism 76, through which lap belt 54 is threaded, such that latch mechanism 76 is slidable along lap belt 54. The second end of shoulder belt 42 is attached to latch mechanism 76.

Figure 10:
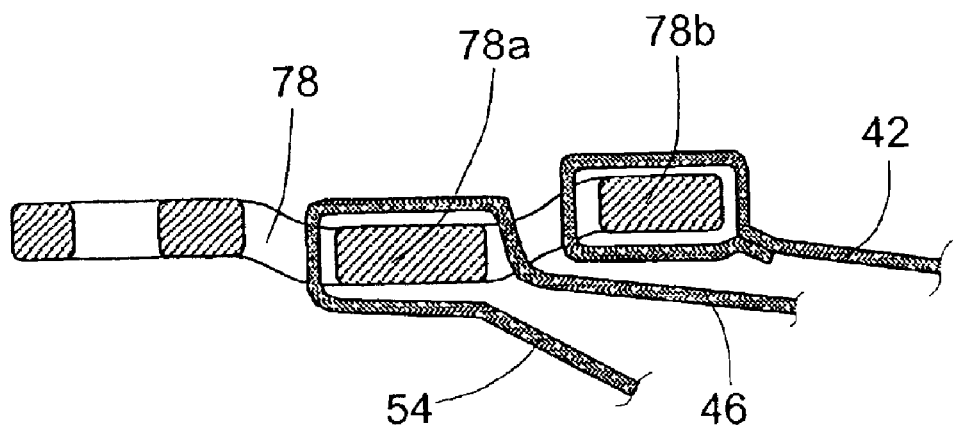
FIG. 10 illustrates the cross-section of another alternative design of the latch mechanism in FIG. 5, cutting through the center to show the routing of the seat belt webbings.

FIG. 10 illustrates the cross-section view of another alternative design of latch mechanism 76 in FIG. 5, cutting through the center to show the routing of the webbing belts. Latch mechanism 76 comprises a seat belt latch 78. Seat belt latch 78 has a webbing loop 78a and a webbing loop 78b. The second end of shoulder belt 42 attaches to webbing loop 78b. The first end of lap belt 54 is connected to the second end of shoulder belt 46. Lap belt 54 is threaded through webbing loop 78a, such that seat belt latch 78 is slidable along lap belt 54.

Figure 11:
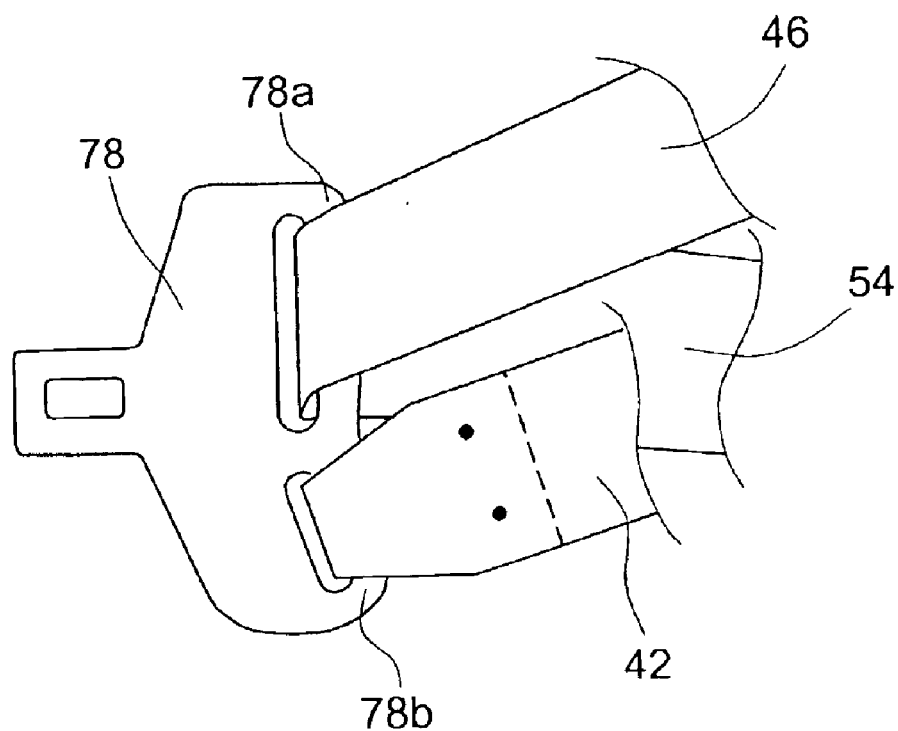
FIG. 11 illustrates the plan view of an alternative design of the latch mechanism in FIG. 10.

FIG. 11 illustrates the plan view of an alternative design of latch mechanism 76 in FIG. 10. Latch mechanism 76 comprises a seat belt latch 78. Seat belt latch 78 has a webbing loop 78a and a webbing loop 78b. The second end of shoulder belt 42 attaches to webbing loop 78b. The first end of lap belt 54 is connected to the second end of shoulder belt 46. Lap belt 54 is threaded through webbing loop 78a, such that seat belt latch 78 is slidable along lap belt 54.

Figure 12:
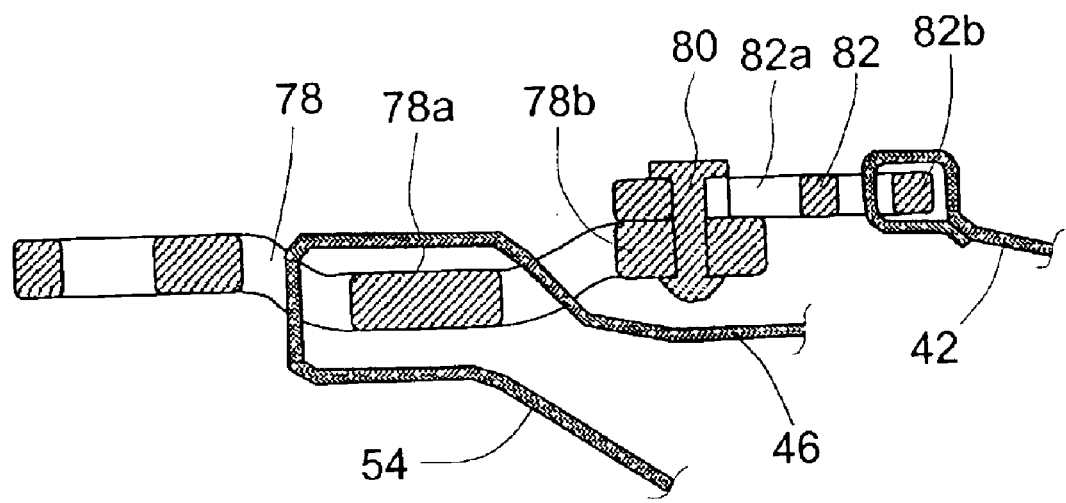
FIG. 12 illustrates the cross-section of a further more alternative design of the latch mechanism in FIG. 5, cutting through the center to show the routing of the seat belt webbings.

FIG. 12 illustrates the cross-section view of a further more alternative design of latch mechanism 76, cutting through the center to show the routing of the webbing belts. Latch mechanism 76 comprises a seat belt latch 78, a hook 80, and an eye plate 82. Seat belt latch 78 has a webbing loop 78a and a webbing loop 78b. Hook 80 is secured on webbing loop 78b. Eye plate 82 has an eyelet 82a for lockably receiving hook 80 and a webbing loop 82b, on which the second end of shoulder belt 42 is attached. The first end of lap belt 54 is connected to the second end of shoulder belt 46. Lap belt 54 is threaded through webbing loop 78a, such that seat belt latch 78 is slidable along lap belt 54.

Figure 13:
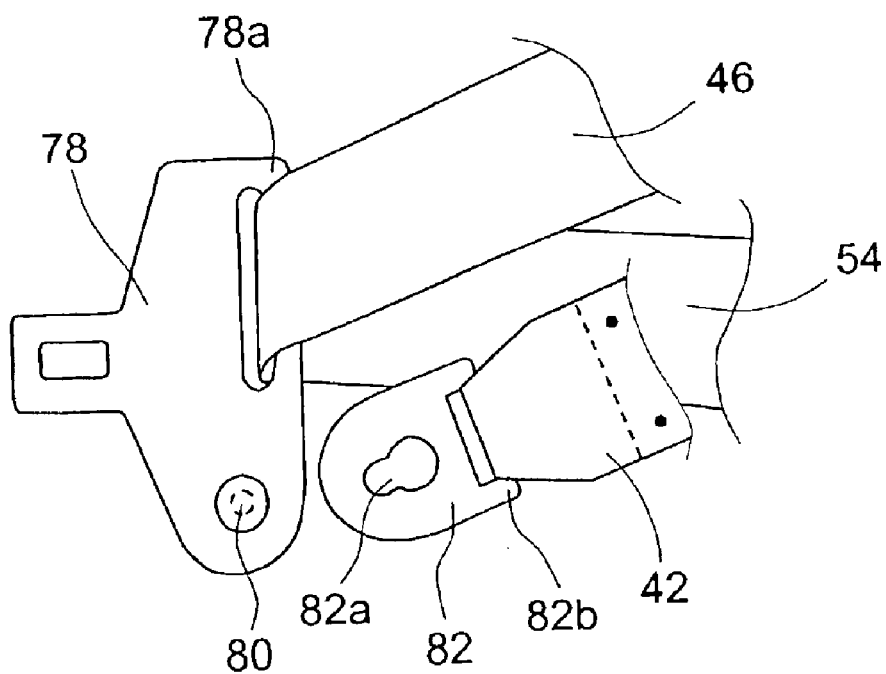
FIG. 13 illustrates the plan view of an alternative design of the latch mechanism in FIG. 12.

FIG. 13 illustrates the plan view of an alternative design of latch mechanism 76 in FIG. 12. Latch mechanism 76 comprises a seat belt latch 78, a hook 80, and an eye plate 82. Seat belt latch 78 has a webbing loop 78a. Hook 80 is secured on seat belt latch 78. Eye plate 82 has an eyelet 82a for lockably receiving hook 80 and a webbing loop 82b, on which the second end of shoulder belt 42 is attached. The first end of lap belt 54 is connected to the second end of shoulder belt 46. Lap belt 54 is threaded through webbing loop 78a, such that seat belt latch 78 is slidable along lap belt 54.

In the third preferred embodiment of latch mechanism 76, the second end of shoulder belt 42, the second end of shoulder belt 46, and the first end of lap belt 54 are all connected to latch mechanism 76. There are no through-belts. Either of the second ends of shoulder belt 42 or 46 can be detachable, such that one of them can be disabled to reconfigure the seat-belt-restraint-system of the present invention as a regular three-point seat-belt-restrain-system. In this preferred embodiment of the present invention, retractor 56 is provided to furnish a predetermined length of belt webbing for lap belt 54.

Figure 14:
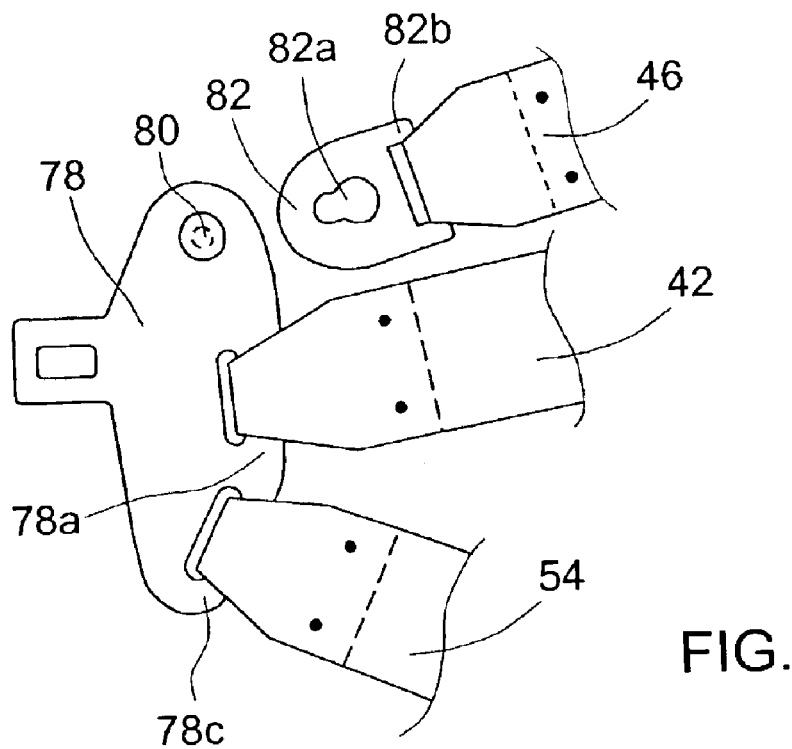
FIG. 14 illustrates the plan view of another design of the latch mechanism in FIG. 5.

FIG. 14 illustrates the plan view of another design of latch mechanism 76. Latch mechanism 76 comprises a seat belt latch 78, a hook 80, and an eye plate 82. Seat belt latch 78 has a webbing loop 78a and a webbing loop 78c. Hook 80 is secured on seat belt latch 78. Eye plate 82 has an eyelet 82a for lockably receiving hook 80 and a webbing loop 82b, on which the second end of shoulder belt 46 is attached. The second end of shoulder belt 42 connects to webbing loop 78a. The first end of lap belt 54 connects to webbing loop 78c.

Figure 15:
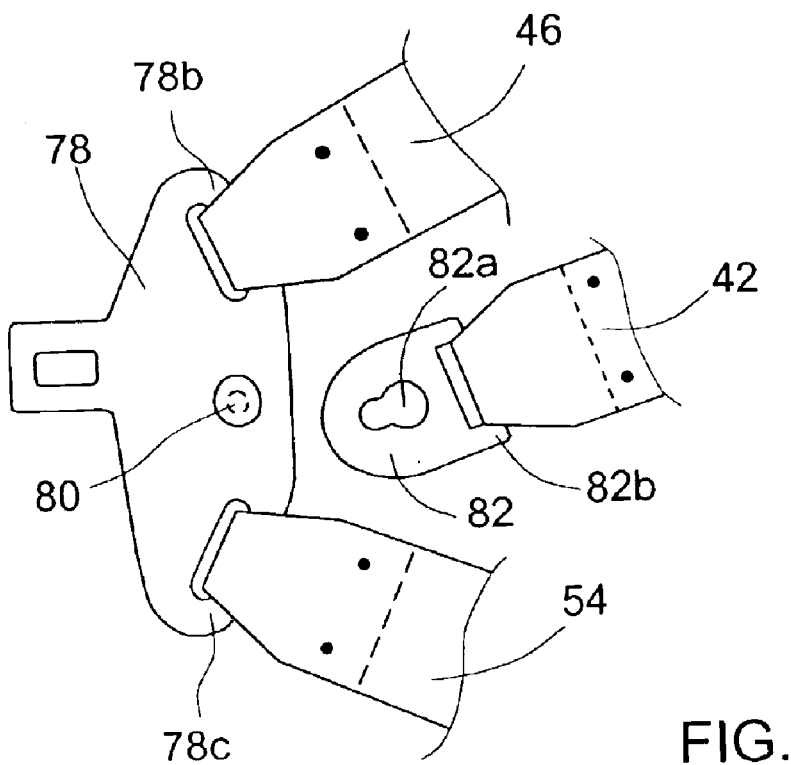
FIG. 15 illustrates the plan view of another design of the latch mechanism in FIG. 5.

FIG. 15 illustrates the plan view of another design of latch mechanism 76. Latch mechanism 76 comprises a seat belt latch 78, a hook 80, and an eye plate 82. Seat belt latch 78 has a webbing loop 78b and a webbing loop 78c. Hook 80 is secured on seat belt latch 78. Eye plate 82 has an eyelet 82a for lockably receiving hook 80 and a webbing loop 82b, on which the second end of shoulder belt 42 is attached. The second end of shoulder belt 46 connects to webbing loop 78b. The first end of lap belt 54 connects to webbing loop 78c.

Figure 16:
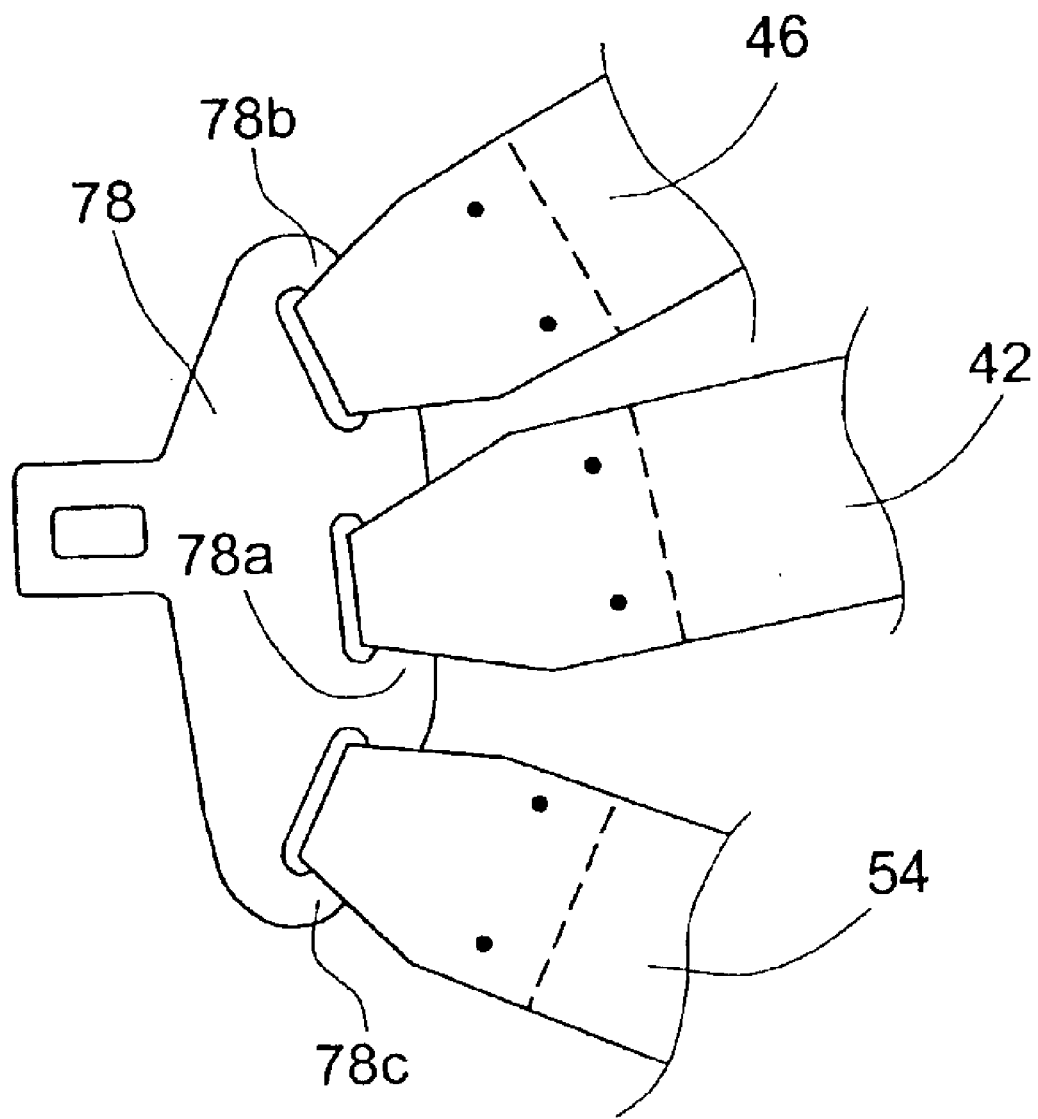
FIG. 16 illustrates the plan view of another design of the latch mechanism in FIG. 5.

FIG. 16 illustrates the plan view of another design of latch mechanism 76. Latch mechanism 76 comprises a seat belt latch 78. Seat belt latch 78 has a webbing loop 78a, a webbing loop 78b, and a webbing loop 78c. The second end of shoulder belt 42 connects to webbing loop 78a. The second end of shoulder belt 46 connects to webbing loop 78b. The first end of lap belt 54 connects to webbing loop 78c.

In operation, when occupant 30 is seated in vehicle seat 32, occupant 30 pulls seat belt latch 58 or latch mechanism 76 across the upper torso to the inboard side and then locks seat belt latch 58 or 78 onto seat belt buckle 60. Both shoulder belts 42 and 46 would run across the occupant's upper torso, thereby providing double shoulder belts and consequently double security against accidents, and thereby restraining occupant 30 to vehicle seat 32.

Accordingly, readers will see that occupants can use this seat-belt-restraint-system of the present invention against various accident modes. It provides the benefits of pillar/roof-rail mounted three-point seat-belt-restraint-systems, the benefits of seat mounted three-point seat-belt-restraint-systems, and most of the benefits of four-point seat-belt-restraint-systems, in the performance of occupant restraint. At the same time, it preserves the convenience of use of three-point seat-belt-restraint-systems. Therefore, it is safe, comfortable, and convenient to use, thereby encouraging its application and seat belt usage.

The present invention has been described in an illustrative manner. It is to be understood that the terminology, which has been used, is intended to be in the nature of words of description rather than of limitation.

Although the invention has been described in its preferred forms and structures with a certain degree of particularity, these should not be construed as limiting the scope of the invention but as merely providing illustrations of some of the presently preferred embodiments of this invention.

For examples, the description of this invention addresses specifically vehicle seat-belt-restraint-systems. However, other modes of transportation, such as airplanes, rail trains, ship and cruise, and other seats, such as wheel chairs, can also make use of this invention.

Those skilled in the art can perceive improvements. For examples, obvious improvements can come with the additions of pretension devices (not shown), or energy management devices (not shown), or deployable seat belt webbings and devices (not shown), or any combinations of these devices. Some other obvious improvements can come with variations of connect and latch mechanisms.

Thus it is understood that the present disclosure of the preferred forms can be changed in the details of construction and in the combination and arrangement of parts without departing from the spirit and the scope of the invention as hereinafter claimed.

What I claim as my invention is:

1. A seat-belt-restraint-system for a vehicle occupant in a vehicle seated in a vehicle seat having a seatback and a seat portion, said seat-belt-restraint-system comprising:

a first shoulder belt having a first end adapted to be connected to said vehicle and adapted to be extended from an upper portion of said vehicle adjacent the outboard shoulder of said vehicle occupant and a second end;

a first seat belt retractor associated with said first shoulder belt for connecting said first end of said first shoulder belt to said vehicle and adapted to be secured to said vehicle;

a second shoulder belt having a first end adapted to be connected to said vehicle and adapted to be extended from an upper portion of said seatback adjacent the outboard shoulder of said vehicle occupant and a second end;

a second seat belt retractor associated with said second shoulder belt for connecting said first end of said second shoulder belt to said vehicle and adapted to be secured to said seatback;

a middle portion belt having a first end and a second end;

a connect mechanism interconnecting said second end of said first shoulder belt, said second end of said second shoulder belt, and said first end of said middle portion belt;

a lap belt having a first end and a second end adapted to be anchored to said vehicle and disposed on the outboard side of said vehicle seat;

a seat belt latch interconnecting said first end of said lap belt and said second end of said middle portion belt; and a seat belt buckle anchored to said vehicle and disposed on the inboard side of said vehicle seat for lockably receiving said seat belt latch.

2. A seat-belt-restraint-system as defined in claim 1, further including a third seat belt retractor associated with said lap belt for connecting said second end of said lap belt to said vehicle, whereby additional predetermined lap belt length is provided and the position of said connect mechanism with respect to an occupant while in use is predetermined.

3. A seat-belt-restraint-system as defined in claim 1, wherein said first end of said lap belt is connected to said second end of said middle portion belt, and wherein said seat belt latch has a webbing loop, through which said middle portion belt is threaded, such that said seat belt latch is slidable along said middle portion belt.

4. A seat-belt-restraint-system as defined in claim 1, wherein said connect mechanism comprises:

a hook plate having a webbing loop connected to said first end of said middle portion belt, a first hook, and a second hook;

a first eye plate having a webbing loop connected to said second end of said first shoulder belt and an eyelet for lockably receiving said first hook of said hook plate; and a second eye plate having a webbing loop connected to said second end of said second shoulder belt and an eyelet for lockably receiving said second hook of said hook plate.

5. A seat-belt-restraint-system as defined in claim 1, wherein said connect mechanism comprises:
- a hook plate having a webbing loop connected to said first end of said middle portion belt, another webbing loop connected to said second end of said first shoulder belt, and a hook; and
- an eye plate having a webbing loop connected to said second end of said second shoulder belt and an eyelet for lockably receiving said hook of said hook plate.

6. A seat-belt-restraint-system as defined in claim 1, wherein said connect mechanism comprises:
- a hook plate having a webbing loop connected to said first end of said middle portion belt, another webbing loop connected to said second end of said second shoulder belt, and a hook; and
- an eye plate having a webbing loop connected to said second end of said first shoulder belt and an eyelet for lockably receiving said hook of said hook plate.

7. A seat-belt-restraint-system for a vehicle occupant in a vehicle seated in a vehicle seat having a seatback and a seat portion, said seat-belt-restraint-system comprising:
- a first shoulder belt having a first end adapted to be connected to said vehicle and adapted to be extended from an upper portion of said vehicle adjacent the outboard shoulder of said vehicle occupant and a second end;
- a first seat belt retractor associated with said first shoulder belt for connecting said first end of said first shoulder belt to said vehicle and adapted to be secured to said vehicle;
- a second shoulder belt having a first end adapted to be connected to said vehicle and adapted to be extended from an upper portion of said seatback adjacent the outboard shoulder of said vehicle occupant and a second end;
- a second seat belt retractor associated with said second shoulder belt for connecting said first end of said second shoulder belt to said vehicle and adapted to be secured to said seatback;
- a lap belt having a first end and a second end adapted to be anchored to said vehicle and disposed on the outboard side of said vehicle seat;
- a latch mechanism interconnecting said second end of said first shoulder belt, said second end of said second shoulder belt, and said first end of said lap belt; and
- a seat belt buckle anchored to said vehicle and disposed on the inboard side of said vehicle seat for lockably receiving said latch mechanism.

8. A seat-belt-restraint-system as defined in claim 7, wherein said latch mechanism is a seat belt latch having a webbing loop connected to said second end of said second shoulder belt, and wherein said first end of said lap belt is connected to said second end of said first shoulder belt and said lap belt is threaded through said webbing loop of said seat belt latch, such that said seat belt latch is slidable along said lap belt.

9. A seat-belt-restraint-system as defined in claim 7, wherein said latch mechanism is a seat belt latch having a first webbing loop connected to said second end of said second shoulder belt and a second webbing loop, and wherein said first end of said lap belt is connected to said second end of said first shoulder belt and said lap belt is threaded through said second webbing loop of said seat belt latch, such that said seat belt latch is slidable along said lap belt.

10. A seat-belt-restraint-system as defined in claim 7, wherein said latch mechanism comprises a seat belt latch having a webbing loop, a hook secured to said seat belt latch, and an eye plate having a webbing loop connected to said second end of said second shoulder belt and an eyelet for lockably receiving said hook, and wherein said first end of said lap belt is connected to said second end of said first shoulder belt and said lap belt is threaded through said webbing loop of said seat belt latch, such that said seat belt latch is slidable along said lap belt.

11. A seat-belt-restraint-system as defined in claim 7, wherein said latch mechanism is a seat belt latch having a first webbing loop connect to said second end of said first shoulder belt and a second webbing loop, and wherein said first end of said lap belt is connected to said second end of said second shoulder belt and said lap belt is threaded through said second webbing loop of said seat belt latch, such that said seat belt latch is slidable along said lap belt.

12. A seat-belt-restraint-system as defined in claim 7, wherein said latch mechanism comprises a seat belt latch having a webbing loop, a hook secured to said seat belt latch, and an eye plate having a webbing loop connected to said second end of said first shoulder belt and an eyelet for lockably receiving said hook, and wherein said first end of said lap belt is connected to said second end of said second shoulder belt and said lap belt is threaded through said webbing loop of said seat belt latch, such that said seat belt latch is slidable along said lap belt.

13. A seat-belt-restraint-system as defined in claim 7, further including a third seat belt retractor associated with said lap belt for connecting said second end of said lap belt to said vehicle and adapted to be secured to said vehicle.

14. A seat-belt-restraint-system as defined in claim 13, wherein said latch mechanism comprises a seat belt latch having a first webbing loop connected to said second end of said first shoulder belt and a second webbing loop connected to said first end of said lap belt, a hook secured to said seat belt latch, and an eye plate having a webbing loop connected to said second end of said second shoulder belt and an eyelet for lockably receiving said hook.

15. A seat-belt-restraint-system as defined in claim 13, wherein said latch mechanism comprises a seat belt latch having a first webbing loop connected to said second end of said second shoulder belt and a second webbing loop connected to said first end of said lap belt, a hook secured to said seat belt latch, and an eye plate having a webbing loop connected to said second end of said second end of said first shoulder belt and an eyelet for lockably receiving said hook.

16. A seat-belt-restraint-system as defined in claim 13, wherein said latch mechanism comprises a seat belt latch having a first webbing loop connected to said second end of said first shoulder belt, a second webbing loop connected to said second end of said first shoulder belt, and a third webbing loop connected to said first end of said lap belt.

* * * * *